United States Patent

Kato et al.

[11] 3,903,087
[45] Sept. 2, 1975

[54] 1,2-DIHYDROINDENE-2-SPIRO-2'-PIPERAZINE DERIVATIVES AND PROCESS FOR THE PRODUCTION THEREOF

[75] Inventors: Hideo Kato; Eiichi Koshinaka, both of Fukui, Japan

[73] Assignee: Hokuriku Pharmaceutical Co., Ltd., Fukui, Japan

[22] Filed: Nov. 14, 1973

[21] Appl. No.: 415,517

[30] Foreign Application Priority Data
Nov. 20, 1972  Japan.............................. 47-115582

[52] U.S. Cl..... 260/268 PC; 260/268 TR; 424/232; 424/250
[51] Int. Cl.²........................................ C07D 295/08
[58] Field of Search................ 260/268 TR, 268 PC

[56] References Cited
UNITED STATES PATENTS
2,575,122   11/1951   Pollard et al................ 260/268 PH

*Primary Examiner*—Richard J. Gallagher
*Assistant Examiner*—Jose Tovar
*Attorney, Agent, or Firm*—Burgess, Ryan and Wayne

[57] ABSTRACT

Compounds of the formula:

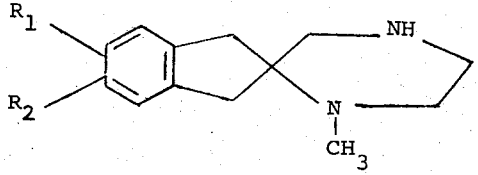

and the salts thereof are disclosed. In the above formula $R_1$ and $R_2$ are each hydrogen, lower alkoxy, or taken together forming methylenedioxy. These compounds are useful as analgesics, antihistamines, and spasmolytic agents.

11 Claims, No Drawings

1,2-DIHYDROINDENE-2-SPIRO-2'-PIPERAZINE DERIVATIVES AND PROCESS FOR THE PRODUCTION THEREOF

The present invention relates to novel piperazine derivatives having therapeutic activity and to a process of producing such derivatives. More particularly, the present invention is directed to novel 1,2-dihydroindene-2-spiro-2'-piperazine derivatives represented by the formula:

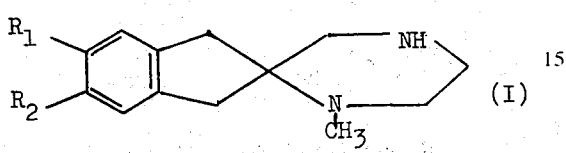

wherein $R_1$ and $R_2$ each represents a hydrogen atom, a lower alkoxy group, preferably up to six carbon atoms, or when combined together, $R_1$ and $R_2$ represent a methylenedioxy group, and salts thereof.

According to the present invention, compound(I) can be produced by the reduction of a 5-methyl-1-oxo-1,2,3,4,11,11a-hexahydro-6H-pyrazino[1.2-b]isoquinolinium halide derivative represented by the formula:

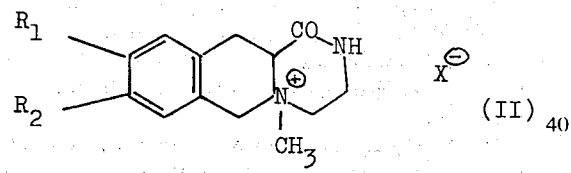

wherein X is a halogen atom, and $R_1$ and $R_2$ are defined above, with lithium aluminum hydride.

We have found that after studying a various reductive ring open reactions of compound(II), the spiro compound (I) can be specifically formed by the reduction of compound(II) using lithium aluminum hydride.

The present invention is carried out by reducing compound (II) with lithium aluminum hydride in organic solvents. The amount of lithium aluminum hydride to be employed is preferably of from 0.01–10 mols, more preferably 5–6 mols, per 1 mol of compound (II).

The reaction can proceed upon cooling or with heating, but preferred reaction temperatures are near the boiling points of the solvents employed. As organic solvents, there can be used absolute ether, absolute tetrahydrofuran, absolute dioxane, etc.

The starting compounds(II) can easily be obtained by the reaction of 1,2,3,4,11,11a-hexahydro-6H-pyrazino[1.2-b]isoquinoline-1-one derivatives and methyl halides in a conventional manner, which is hereafter described with reference to synthesis examples.

The product(I) in accordance with the present invention, can be converted into the corresponding salts using inorganic acids or organic acids. Specific examples of these acids include hydrochloric acid, hydrobromic acid, sulfuric acid, lactic acid, maleic acid, fumaric acid, succinimic acid, tartaric acid, salicylic acid, oxalic acid citric acid, etc.

Compound (I) produced in accordance with the present invention has analgetic, anti-histamic and spasmolytic activities. Compound(I) of the present invention itself is suitable for use as a therapeutic agent and is also useful as an intermediate for preparing other pharmaceutical agents.

SYNTHESIS EXAMPLE 1

Production of 5-methyl-1-oxo-1,2,3,4,11,11a-hexahydro-6H-pyrazino[1.2-b]isoquinolinium iodide In 150 ml of methanol there was dissolved, with heating, 8.08 g of 1,2,3,4,11,11a-hexahydro-6H-pyrazino[1.2-b]isoquinoline-1-one. To the solution 17 g of methyl iodide was added dropwise. After the completion of the addition, the reaction was conducted at 60°C for 4 hours. After completing the reaction, the precipitated crystals were separated by filtration. Upon recrystallization from water, the desired compound was obtained in an amount of 10.2 g, a melting point of which was 235°–237°C (decomposed).

Elemental Analysis: $C_{13}H_{17}ON_2I$ Calcd.: C, 45.36; H, 4.98; N, 8.14. Found: C, 45.87; H, 5.08; N, 8.11.

Similar procedures were repeated to obtain the following compounds.

i. 5-Methyl-8,9-dimethoxy-1-oxo-1,2,3,4,11,11a-hexahydro-6H-pyrazino[1.2-b]isoquinolinium iodide; melting point 210°–212°C (from methanol)

ii. 5-Methyl-8,9-methylenedioxy-1-oxo-1,2,3,4,11,11a-hexahydro-6H-pyrazino[1.2-b]isoquinolinium iodide; melting point 280°C (from methanol)

The present invention is further explained in detail with reference to the following examples.

EXAMPLE 1

Synthesis of 1-methyl-1,2-dihydroindene-2-spiro-2'-piperazine

In absolute tetrahydrofuran 3.8 g of lithium aluminum hydride was suspended. To the suspension 3.44 g of 5-methyl-1-oxo-1,2,3,4,11,11a-hexahydro-6H-pyrazino[1.2-b]isoquinolinium iodide was added in limited amounts. After the completion of the addition, stirring was continued for 17 hours under reflux. After completing the reaction, water was poured into the reaction mixture to decompose excess lithium aluminum hydride and then filtered. The solids were washed with tetrahydrofuran. The washed liquid was combined with the filtrate. The solvent was removed from the combined liquid by distillation. The residue was dissolved in 10% hydrochloric acid and then washed with ether. The aqueous layer was rendered alkalline with $K_2CO_3$ and then extracted with ether. The ethereal layer was washed with water and dehydrated. The residue after removing the ether was subjected to column chromatography using silica gel(Wakogel C-200, tradename made by Wako Junyaku Co., Ltd., developing solvent: chloroform-methanol), to purify.

After removing the solvent by distillation, the residue was converted into the hydrochloride thereof in a conventional manner. Upon recrystallization from a methanol/isopropyl ether mixture, 1.75 g of the hydrochloride of the desired product was obtained. The melting point thereof was 235°–240°C.

Elemental Analysis: $C_{13}H_{18}N_2 \cdot 2HCl$ Calcd.: C, 56.73; H, 7.33; N, 10.18. Found: C, 50.50; H, 7.24; N, 9.79.

The following compounds were obtained in a similar manner.

i. 5,6-Dimethoxy-1'-methyl-1,2-dihydroindene-2-spiro-2'-piperazine dihydrochloride; melting point 277°–280°C (from methanol/isopropyl ether)

ii. 5,6-Methylenedioxy-1'-methyl-1,2-dihydroindene-2-spiro-2'-piperazine dihydrochloride; melting point 275°–278°C (from methanol)

What is claimed is:

1. A member selected from the group consisting of a 1,2-dihydroindene-2-spiro-2'-piperazine of the formula:

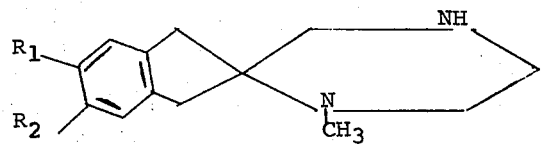

wherein $R_1$ and $R_2$ each represent a member selected from the group consisting of hydrogen, lower alkoxy of 1 to 6 carbon atoms, and $R_1$ and $R_2$ when combined together, form a methylenedioxy group, and the corresponding pharmaceutically acceptable acid addition salts thereof.

2. A 1,2-dihydroindene-2-spiro-2'-piperazine compound of claim 1 wherein $R_1$ and $R_2$ each represent a lower alkoxy group of 1 to 6 atoms.

3. A 1,2-dihydroindene-2-spiro-2'-piperazine pharmaceutically acceptable salt according to claim 1 selected from the group consisting of the hydrochloride, hydrobromide and sulfate.

4. A 1,2-dihydroindene-2-spiro-2'-piperazine pharmaceutically acceptable salt according to claim 1 selected from the group consisting of the lactate, maleate, fumarate, succinate, tartrate, salicylate, oxalate and citrate.

5. 1'-Methyl-1,2-dihydroindene-2-spiro-2'-piperazine, and the corresponding pharmaceutically acceptable acid addition salts thereof.

6. 5,6-Dimethoxy-1'-methyl-1,2-dihydroindene-2-spiro-2'-piperazine and the corresponding pharmaceutically acceptable acid addition salts thereof.

7. 5,6-Methylenedioxy-1'-methyl-1,2-dihydroindene-2-spiro-2'-piperazine the corresponding pharmaceutically acceptable acid addition salts thereof.

8. A process of producing a 1,2-dihydroindene-2-spiro-2'-piperazine of the formula:

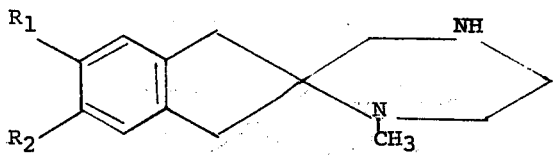

wherein $R_1$ and $R_2$ each represent a hydrogen atom or a lower alkoxy group of 1 to 6 carbon atoms, or $R_1$ and $R_2$, when combined together, represent a methylenedioxy group, which consists essentially of reducing with lithium aluminum hydride a 5-methyl-1-oxo-1,2,3,4,11,11a-hexahydro-6H-pyrazino isoquinolinium halide of the formula:

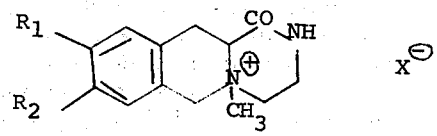

wherein X is a halogen atom, and $R_1$ and $R_2$ are the same as defined above, in the presence of an organic solvent.

9. A process of claim 8 wherein said lithium aluminum-hydride is employed in an amount of 0.01–10 mols per 1 mol of said 5-methyl-1-oxo-1,2,3,4,11,11a-hexahydro-6H-pirazino[1,2-b]isoquinolinium halide derivative.

10. A process of claim 8 wherein said reduction is conducted at temperatures near the boiling point of the solvent employed.

11. A process of claim 10 wherein said solvent is selected from the group consisting of absolute ether, absolute tetrahydrofuran and absolute dioxane.

* * * * *